(12) United States Patent
Matsumura et al.

(10) Patent No.: US 11,178,621 B2
(45) Date of Patent: Nov. 16, 2021

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/057,166

(22) PCT Filed: May 22, 2019

(86) PCT No.: PCT/JP2019/020298
§ 371 (c)(1),
(2) Date: Nov. 20, 2020

(87) PCT Pub. No.: WO2019/225656
PCT Pub. Date: Nov. 28, 2019

(65) Prior Publication Data
US 2021/0211991 A1 Jul. 8, 2021

(30) Foreign Application Priority Data
May 23, 2018 (JP) .............................. JP2018-110695

(51) Int. Cl.
*H04W 52/32* (2009.01)
(52) U.S. Cl.
CPC ................................. *H04W 52/325* (2013.01)

(58) Field of Classification Search
CPC ...... H04W 52/00–60; H04L 27/26; H04J 1/00
See application file for complete search history.

(56) References Cited

U.S. PATENT DOCUMENTS

| | | | |
|---|---|---|---|
| 2015/0117352 A1* | 4/2015 | Nammi | H04L 5/0058 370/329 |
| 2017/0099175 A1* | 4/2017 | Tian | H04W 72/042 |
| 2018/0077668 A1* | 3/2018 | Chun | H04W 76/23 |
| 2019/0261279 A1* | 8/2019 | Qi | H04W 76/27 |

OTHER PUBLICATIONS

International Search Report issued in Application No. PCT/JP2019/020298, dated Jul. 16, 2019 (3 pages).
(Continued)

*Primary Examiner* — Raymond S Dean
(74) *Attorney, Agent, or Firm* — Osha Bergman Watanabe & Burton LLP

(57) ABSTRACT

Transmission power for a PTRS (Phase Tracking Reference Signal) is appropriately determined. A user terminal according to one aspect of the present disclosure includes a receiving section configured to receive a downlink shared channel (PDSCH (Physical Downlink Shared Channel)) and a PTRS (Phase Tracking Reference Signal), and a control section configured to assume that transmission power for the PTRS is scaled based on a ratio between PDSCH EPRE (Energy Per Resource Element) and PTRS EPRE corresponding to a value of a higher layer parameter, in which at least one set of the ratios corresponding to the value of the higher layer parameter includes only a value of the ratio that is equal to or smaller than a given value.

3 Claims, 10 Drawing Sheets

(56) References Cited

OTHER PUBLICATIONS

Written Opinion issued in International Application No. PCT/JP2019/020298, dated Jul. 16, 2019 (3 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG RAN WG1 Meeting #93; R1-1806285; "Remaining issues on PT-RS;" CATT; May 21-25, 2018; Busan, Korea (6 pages).

* cited by examiner

| epre-RatioPort1 or epre-RatioPort2 | NUMBER OF PDSCH LAYERS IN DMRS PORT GROUP INCLUDING DMRS PORT RELATED TO PT-RS PORT I ($n_{DMRS}^{PTRS,i}$) | | | | | |
|---|---|---|---|---|---|---|
| | 1 | 2 | 3 | 4 | 5 | 6 |
| 0 | 0 | 3 | 4.77 | 6 | 7 | 7.78 |
| 1 | 0 | 0 | 0 | 0 | 0 | 0 |
| 2 | Reserved | | | | | |
| 3 | Reserved | | | | | |

FIG. 1

| epre-RatioPort1 or epre-RatioPort2 | NUMBER OF PDSCH LAYERS IN DMRS PORT GROUP INCLUDING DMRS PORT RELATED TO PT-RS PORT i ($n_{DMRS}^{PTRS,i}$) | | | | | |
|---|---|---|---|---|---|---|
| | 1 | 2 | 3 | 4 | 5 | 6 |
| 0 | 0 | 3 | 4.77 | 6 | 6 | 6 |
| 1 | 0 | 0 | 0 | 0 | 0 | 0 |
| 2 | Reserved | | | | | |
| 3 | Reserved | | | | | |

FIG. 2

| epre-RatioPort1 or epre-RatioPort2 | NUMBER OF PDSCH LAYERS IN DMRS PORT GROUP INCLUDING DMRS PORT RELATED TO PT-RS PORT i ($n^{PTRS,i}_{DMRS}$) | | | | | |
|---|---|---|---|---|---|---|
| | 1 | 2 | 3 | 4 | 5 | 6 |
| 0 | 0 | 3 | 4.77 | 6 | 7 | 7.78 |
| 1 | 0 | 0 | 0 | 0 | 0 | 0 |
| 2 | 0 | 3 | 4.77 | 6 | 6 | 6 |
| 3 | Reserved | | | | | |

FIG. 3

| epre-RatioPort1 or epre-RatioPort2 | NUMBER OF PDSCH LAYERS IN DMRS PORT GROUP INCLUDING DMRS PORT RELATED TO PT-RS PORT i ($n_{DMRS}^{PTRS,i}$) | | | | | |
|---|---|---|---|---|---|---|
| | 1 | 2 | 3 | 4 | 5 | 6 |
| 0 | 0 | $10\log_{10}(2)$ | $10\log_{10}(3)$ | $10\log_{10}(4)$ | $10\log_{10}(5)$ | $10\log_{10}(6)$ |
| 1 | 0 | 0 | 0 | 0 | 0 | 0 |
| 2 | 0 | $10\log_{10}(2)$ | $10\log_{10}(3)$ | $10\log_{10}(4)$ | $10\log_{10}(4)$ | $10\log_{10}(4)$ |
| 3 | Reserved | | | | | |

FIG. 4

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see Non-Patent Literature 1). In addition, the specifications of LTE-A (LTE Advanced, LTE Rel. 10, 11, 12, 13) have been drafted for the purpose of further increasing the capacity and sophistication of LTE (LTE Rel. 8, 9).

Successor systems of LTE (for example, FRA (Future Radio Access), 5G (5th generation mobile communication system), 5G+ (plus), NR (New Radio), NX (New radio access), FX (Future generation radio access), LTE Rel. 14 or 15 or later versions) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In a future radio communication system (for example, NR), a base station (for example, gNB) transmits a PTRS (Phase Tracking Reference Signal) on the downlink.

Unfortunately, configurations that have been under study so far involve a risk of increasing interference from a transmission antenna of the base station, due to amplification of transmission power for the PTRS. This results in adverse effects such as compromised throughput.

In view of this, an object of the present disclosure is to provide a user terminal and a radio communication method enabling PTRS transmission power to be appropriately determined.

Solution to Problem

A user terminal according to one aspect of the present disclosure includes a receiving section configured to receive a downlink shared channel (PDSCH (Physical Downlink Shared Channel)) and a PTRS (Phase Tracking Reference Signal), and a control section configured to assume that transmission power for the PTRS is scaled based on a ratio between PDSCH EPRE (Energy Per Resource Element) and PTRS EPRE corresponding to a value of a higher layer parameter, in which at least one set of the ratios corresponding to the value of the higher layer parameter includes only a value of the ratio that is equal to or smaller than a given value.

Advantageous Effects of Invention

An aspect of the present disclosure enables PTRS transmission power to be appropriately determined.

BRIEF DESCRIPTION OF DRAWINGS

FIG. 1 is a diagram showing an example of a table showing the relationship between higher layer parameters (epre-RatioPort1 or epre-RatioPort2) related to the PTRS power and $\alpha_{PTRS,i}$.

FIG. 2 is a diagram showing an example of an $\alpha_{PTRS,i}$ table according to one embodiment.

FIG. 3 is a diagram showing an example of an $\alpha_{PTRS,i}$ table according to another embodiment.

FIG. 4 is a diagram showing an example in which a part of the table of FIG. 3 is expressed in a logarithmic format.

DESCRIPTION OF EMBODIMENTS

Figure 5:
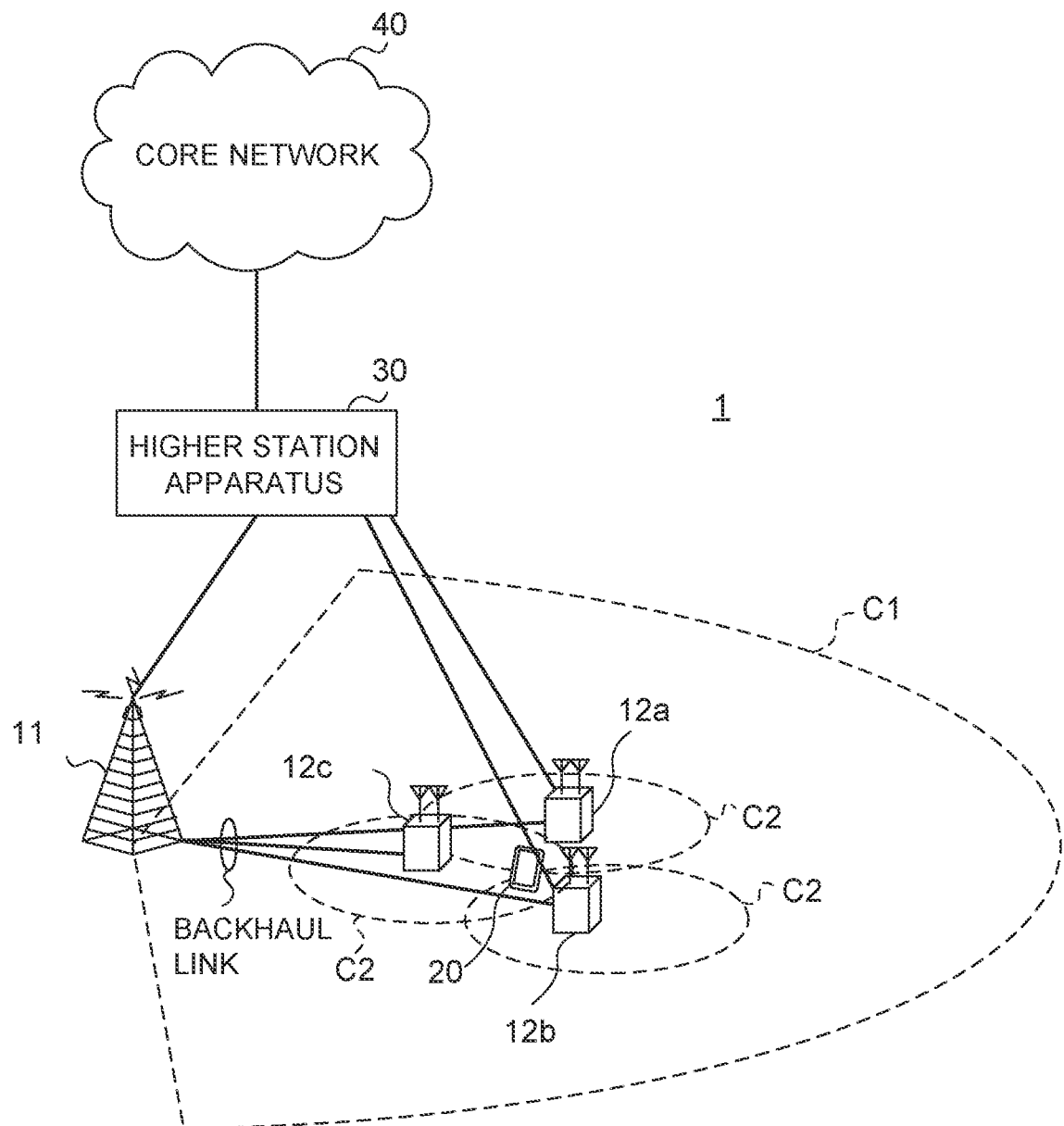
FIG. 5 is a diagram showing an example of a schematic structure of a radio communication system according to one embodiment.

In NR, a base station (for example, gNB) transmits a PTRS (Phase Tracking Reference Signal) on the downlink. The base station may transmit the PTRS mapped in one subcarrier continuously or non-continuously in the time direction. The base station may transmit the PTRS in at least a part of a period (such as a slot or a symbol) for transmitting a downlink shared channel (PDSCH (Physical Downlink Shared Channel)).

The PTRS transmitted by the base station may be referred to as DL PTRS. Hereinafter, DL PTRS is simply referred to as PTRS.

The UE may determine whether the PTRS is on the downlink based on the configuration of higher layer signaling (for example, whether there is PTRS-DownlinkConfig information element). The UE may assume that the PTRS is in a resource block for the PDSCH. The UE may determine the phase noise based on the PTRS and correct the phase error of the received signal.

Here, the higher layer signaling may be, for example, any of RRC (Radio Resource Control) signaling, MAC (Medium Access Control) signaling, broadcast information and so on, or a combination thereof.

For the MAC signaling, for example, a MAC control element (MAC CE), a MAC PDU (Protocol Data Unit), or the like may be used. The broadcast information may be, for example, a master information block (MIB), a system information block (SIB), a minimum system information (Remaining Minimum System Information (RMSI)), other system information (OSI), or the like.

The number of PTRS ports $N_{PTRS}$ may be one or more (for example, two), and may be configured for the UE using higher layer signaling (for example, higher layer parameter "nrofPTRS-Ports").

When the number of PTRS associated with PDSCH and scheduled for the UE is $N_{PTRS}$ and a PTRS port i is associated with a given number $n^{PTRS,i}_{DMRS}$) of DMRS ports, the transmission power for the PTRS port i may be obtained based on a power ratio $\rho_{PTRS,i}$ between PDSCH and PTRS. The power ratio may be expressed as a power ratio between PDSCH EPRE (Energy Per Resource Element) and PTRS EPRE per layer, per resource element, and per PTRS port.

The power amplification factor (PTRS scaling factor $\beta_{PTRS,i}$) for the PTRS port i may be determined based on $\rho_{PTRS,i}$[dB]. For example, $\beta_{PTRS,i}$ may be obtained as $10^{\{-\rho_{PTRS,i}/20\}}$.

The base station may map the signal obtained by multiplying the PTRS sequence by $\beta_{PTRS,i}$ to the PTRS resource element and transmit the resultant signal. When the PTRS is in PDSCH (transmitted together), the UE may assume that the transmission power for the PTRS is scaled by $\beta_{PTRS,i}$.

$\rho_{PTRS,i}$ may be determined based on higher layer parameters (such as epre-RatioPort1 and epre-RatioPort2) related to PTRS power (or EPRE ratio). For example, epre-RatioPort1 may be used when one PTRS port is configured for the UE, or epre-RatioPort2 may be used when a plurality of (for example, two) PTRS ports are configured. With the higher layer signaling, the UE may be notified of DL PTRS configuration information (PTRS-DownlinkConfig information element for RRC signaling) including the higher layer parameter.

$\rho_{PTRS,i}$ may be calculated based on a coefficient $\alpha_{PTRS,i}$ related to the ratio between the PTRS and PDSCH EPRE per layer for the PTRS port i, and may be obtained by $\rho_{PTRS,i}=10 \log_{10} (N_{PTRS})-\alpha_{PTRS,i}$ [dB].

FIG. 1 is a diagram showing an example of a table showing the relationship between higher layer parameters (epre-RatioPort1 or epre-RatioPort2) related to the PTRS power and $\alpha_{PTRS,i}$. Hereinafter, the table showing this relationship is also referred to as an $\alpha_{PTRS,i}$ table. In this example, four values (0, 1, 2, 3) are shown as the higher layer parameters, but the value and the possible number of the higher layer parameters are not limited to this.

As shown in FIG. 1, $\alpha_{PTRS,i}$ is determined based on higher layer parameters related to the PTRS power and the number of PDSCH layers ($n^{PTRS,i}_{DMRS}$) in a DMRS port group including a DMRS port associated with the PTRS port i. The example in FIG. 1 corresponds to an example in which $n^{PTRS,i}_{DMRS}=\{1, 2, 3, 4, 5, 6\}$, but the possible values are not limited to the values shown in FIG. 1.

According to FIG. 1, for example, when epre-RatioPort1=0 and $n^{PTRS,i}_{DMRS}=2$, $\alpha_{PTRS,i}$ 3 is obtained. Note that $\alpha_{PTRS,i}$ corresponding to epre-RatioPort1 (and epre-RatioPort2)=2 and 3 is reserved.

In addition, when no higher layer parameter (epre-RatioPort1 and epre-RatioPort2) is configured for the UE, the UE may assume that the higher layer parameter is configured to be 0.

FIG. 1 shows an $\alpha_{PTRS,i}$ table that has been under study so far in the discussion regarding NR. As shown in the figure, this table includes a case where $\alpha_{PTRS,i}$ exceeds 6 dB. However, when the PTRS power is amplified exceeding 6 dB, the transmission noise from the transmission antenna of the base station may fail to satisfy EVM (Error Vector Magnitude) requirements. To avoid this, the base station needs additional implementation. This results in a problem in that the manufacturing cost of the base station increases.

Failure to appropriately determine the transmission power of DL PTRS results in adverse effects such as interference and reduced throughput.

In view of this, the present inventors have come up with a method of determining the PTRS transmission power with which the occurrence of interference can be suppressed.

Hereinafter, embodiments according to the present disclosure will be described in detail with reference to the drawings. The radio communication method according to each of the embodiments may be applied independently, or may be applied in combination with others.

Hereinafter, a set of $\alpha_{PTRS,i}$ corresponding to one value of the higher layer parameter (epre-RatioPort1 or epre-RatioPort2) is also referred to as an $\alpha_{PTRS,i}$ set. For example, in FIG. 1 above, the $\alpha_{PTRS,i}$ set for the higher layer parameter=0 includes six numbers {0, 3, 4.77, 6, 7, 7.78}.

(Radio Communication Method)

According to one embodiment, at least one of the UE and the base station may obtain the PTRS power using an $\alpha_{PTRS,i}$ table that includes only values not exceeding a given value (e.g., 6 dB). Thus, the $\alpha_{PTRS,i}$ table may only include $\alpha_{PTRS,i}$ resulting in all $\alpha_{PTRS,i}$ sets being equal to or less than a given value.

FIG. 2 is a diagram showing an example of the $\alpha_{PTRS,i}$ table according to one embodiment. The difference from the table of FIG. 1 is that values of $\alpha_{PTRS,i}$ corresponding to higher layer parameter (epre-RatioPort1 or epre-RatioPort2)=0 and $n^{PTRS,i}_{DMRS}=5$ and 6 are limited to 6. In this case, since the value of each $\alpha_{PTRS,i}$ does not exceed 6, the occurrence of interference due to the PTRS power can be favorably suppressed.

According to another embodiment, at least one of the UE and the base station may obtain the PTRS power using an $\alpha_{PTRS,i}$ table that includes only values exceeding a given value (e.g., 6 dB). In this case, the $\alpha_{PTRS,i}$ table may only include $\alpha_{PTRS,i}$ resulting in at least one $\alpha_{PTRS,i}$ set being equal to or less than a given value. In the case of the present embodiment, the $\alpha_{PTRS,i}$ table can include $\alpha_{PTRS,i}$ exceeding a given value (e.g., 6 dB), so that the PTRS power can be increased to improve the PTRS characteristics depending on the condition.

FIG. 3 is a diagram showing an example of an $\alpha_{PTRS,i}$ table according to another embodiment. The difference from the table of FIG. 1 is that the correspondence corresponding to the higher layer parameter=0 shown in FIG. 2 described above is defined for the higher layer parameter (epre-RatioPort1 or epre-RatioPort2)=2. The base station can suppress the occurrence of interference based on the PTRS power by configuring the higher layer parameter to be 1 or 2, and can further increase the PTRS power by configuring the higher layer parameter to be 0.

In addition, when no higher layer parameter (epre-RatioPort1 and epre-RatioPort2) is configured for the UE, the UE may assume that the higher layer parameter is configured to be a given value (0 or 2, for example). With the assumption that a higher layer parameter (2 in the case of FIG. 3, for example) is configured that corresponds to the $\alpha_{PTRS,i}$ set only including $\alpha_{PTRS,i}$ not exceeding a given value in response to the absence of higher layer parameters, the amount of information related to the notification of such higher layer parameters can be omitted and the occurrence of interference due to the PTRS power can be favorably suppressed.

In the example of FIG. 3, an example where the higher layer parameter (epre-RatioPort1 or epre-RatioPort2)=2 corresponds to the $\alpha_{PTRS,i}$ set only including $\alpha_{PTRS,i}$ not exceeding a given value. However, this should not be construed in a limiting sense. The value of the higher layer parameter corresponding to the $\alpha_{PTRS,i}$ set only including $\alpha_{PTRS,i}$ not exceeding the given value may be any of 0 to 3.

Note that at least one of the UE and the base station may determine (may switch) the $\alpha_{PTRS,i}$ table to be referred to, based on a specific condition. For example, at least one of the UE and the base station may determine to use the $\alpha_{PTRS,i}$ table in FIG. 1 when the PTRS (or PDSCH) is transmitted in a given frequency band (for example, any one of FR1 (Frequency Range 1) and FR2 (Frequency Range 2)), and may determine to use the $\alpha_{PTRS,i}$ table in FIG. 2 when it is transmitted in the other band (the other one of FR1 and FR2).

In other words, for FR2 and FR1, at least one of the UE and the base station may refer to different $\alpha_{PTRS,i}$ tables or may refer to different $\alpha_{PTRS,i}$ sets in the same table. With such a configuration, occurrence of interference can be appropriately suppressed for the FR2 involving a large influence of addition installation of the base station, and the transmission power may not be limited for FR1 (the PTRS power is increased), so that the PTRS characteristics can be improved.

For example, FR1 may be a frequency band of 6 GHz or less (sub-6 GHz), and FR2 may be a frequency band higher than 24 GHz (above-24 GHz). FR1 may be defined as a frequency range in which at least one of 15, 30, and 60 kHz is used as a SCS (Sub-Carrier Spacing). FR2 may be defined as a frequency range in which at least one of 60 and 120 kHz is used as SCS. The frequency bands, definitions, and the like of FR1 and FR2 are not limited to these, and for example, FR1 may be a frequency band higher than FR2.

Note that information regarding the specific condition may be configured for the UE by using higher layer signaling, physical layer signaling, or a combination of these. For example, for the UE, information (which may be referred to as table index, configuration index, and the like) for identifying the $\alpha_{PTRS,i}$ table for calculating the PTRS power for at least one of carriers that are FR1 and FR2.

According to the embodiment described above, the PTRS transmission power can be appropriately estimated.

<Others>

Note that, in the above-described embodiment, an example is described in which the value of $\alpha_{PTRS,i}$ is expressed in an integer and a decimal format. However, this should not be construed in a limiting sense. For example, at least one of the values of $\alpha_{PTRS,i}$ may be expressed in a logarithmic format.

FIG. 4 is a diagram showing an example in which a part of the table of FIG. 3 is expressed in a logarithmic format. Note that "0" cannot be expressed in the logarithmic, and thus may remain unchanged. The advantage of the expression in the logarithmic format is that the value of power can be expressed more accurately. For example, double the power corresponds to $10 \log_{10}(2)$, which in turn corresponds to about 3.01 dB. According to the example of FIG. 4, the PTRS power amplification can be designated in the form of an integral multiple (2 to 6 times) of PDSCH. The expression in the logarithmic format may be adopted to FIGS. 1, 2, and the like.

Further, the values of $\alpha_{PTRS,i}$ in each table is merely an example, and is not limited to the values shown in FIGS. 1 to 4.

Note that "6 dB" in the present disclosure may be read as "$10 \log_{10}(4)$" and vice versa.

Further, although DL PTRS has been described in the above embodiment, it may read as UL PTRS. In this case, one of the base station and the UE may be read as the other one.

(Radio Communication System)

Now, the structure of a radio communication system according to one embodiment will be described below. In this radio communication system, communication is performed using one or a combination of the radio communication methods according to the above embodiments.

FIG. 5 is a diagram showing an example of a schematic configuration of a radio communication system according to one embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

The radio communication system 1 may be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), NR (New Radio), FRA (Future Radio Access), New-RAT (Radio Access Technology), and the like, or may be called a system that achieves these.

The radio communication system 1 includes a radio base station 11 that forms a macro cell C1 covering a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement, number and so on of cells and user terminals 20 are not limited to those illustrated in the drawings.

The user terminals 20 can connect with both the radio base station 11 and the radio base stations 12. The user terminals 20 may use the macro cell C1 and the small cells C2 at the same time using CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as an "existing carrier", a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Moreover, the user terminal 20 can perform communication in each cell using time division duplex (TDD) and/or frequency division duplex (FDD). Further, in each cell (carrier), a single numerology may be applied, or a plurality of different numerologies may be applied.

The radio base station 11 and the radio base station (or between 2 radio base stations 12) may be connected by wire (for example, means in compliance with the CPRI (Common Public Radio Interface) such as optical fiber, an X2 interface and so on) or wirelessly.

The radio base station 11 and each of the radio base stations 12 are independently connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station", a "aggregate node", an "eNB (eNodeB)", a "transmitting/receiving point" and so on. Also, the radio base stations 12 are radio base stations having local coverages, and may be referred to as "small base stations", "micro base stations", "pico base stations", "femto base stations", "HeNBs (Home eNodeBs)", "RRHs (Remote Radio Heads)", "transmitting/receiving points" and so on. Hereinafter the radio base stations 11 and 12 will be collectively referred to as "radio base stations 10", unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. The uplink and downlink radio access methods are not limited to combinations of these, and other radio access methods may be used.

In the radio communication system 1, a downlink shared channel (PDSCH (Physical Downlink Shared Channel)), which is used by each user terminal 20 on a shared basis, a broadcast channel (PBCH (Physical Broadcast Channel)), downlink L1/L2 control channels and so on are used as downlink channels. User data, higher layer control information and SIBs (System Information Blocks) are transmitted in the PDSCH. Further, MIB (Master Information Block) is transmitted by PBCH.

The downlink L1/L2 control channels include PDCCH (Physical Downlink Control Channel), EPDCCH (Enhanced Physical Downlink Control Channel), PCFICH (Physical Control Format Indicator Channel), PHICH (Physical Hybrid-ARQ Indicator Channel) and so on. Downlink control information (DCI), including PDSCH and/or PUSCH scheduling information, and so on, is transmitted by the PDCCH.

Note that scheduling information may be reported via DCI. For example, the DCI to schedule receipt of DL data may be referred to as "DL assignment", and the DCI to schedule transmission of UL data may be referred to as "UL grant".

The number of OFDM symbols to use for the PDCCH is transmitted by the PCFICH. HARQ (Hybrid Automatic Repeat reQuest) delivery acknowledgment information (also referred to as, for example, "retransmission control information", "HARQ-ACKs", "ACK/NACKs" and so on) in response to the PUSCH is transmitted by the PHICH. The EPDCCH is frequency-division-multiplexed with the PDSCH (downlink shared data channel) and used to transmit DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information, and the like are transmitted by PUSCH. Also, in the PUCCH, downlink radio quality information (CQI (Channel Quality Indicator)), delivery acknowledgment information, scheduling requests (SRs) and so on are transmitted. By means of the PRACH, random access preambles for establishing connections with cells are transmitted.

In the radio communication systems 1, cell-specific reference signals (CRSs), channel state information-reference signals (CSI-RSs), demodulation reference signals (DMRSs), positioning reference signals (PRSs) and so on are transmitted as downlink reference signals. Also, in the radio communication system 1, measurement reference signals (SRSs (Sounding Reference Signals)), demodulation reference signals (DMRSs) and so on are transmitted as uplink reference signals. Note that, DMRSs may be referred to as "user terminal-specific reference signals (UE-specific Reference Signals)". Also, the reference signals to be transmitted are by no means limited to these.

(Radio Base Station)

Figure 6:
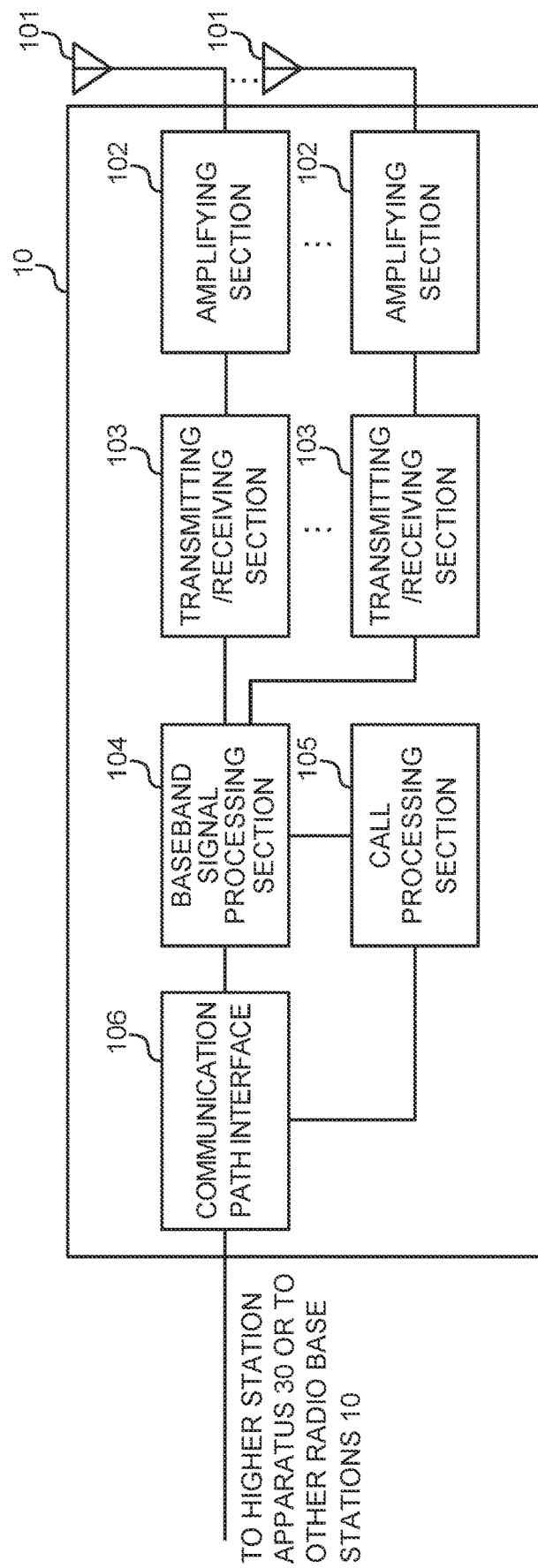
FIG. 6 is a diagram showing an example of an overall configuration of a radio base station according to one embodiment.

FIG. 6 is a diagram showing an example of an overall configuration of a radio base station according to one embodiment. The radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processing such as channel coding and inverse fast Fourier transform, and are transferred to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving device that can be described based on general understanding of the technical field to which the present invention pertains. Note that the transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data included in the input uplink signal is subjected to fast Fourier transform (FFT) processing, inverse discrete Fourier transform (IDFT) processing, error correction decoding, receiving processing for MAC retransmission control, and receiving processing for an RLC layer and a PDCP layer, and the uplink data is transferred to the host station apparatus 30 via the communication path interface 106. The call processing section 105 performs call processing (such as setting and releasing) for communication channels, manages states of the radio base stations 10, manages the radio resources, and so on.

The communication path interface 106 transmits and receives signals to and from the higher station apparatus 30 via a given interface. Moreover, the communication path interface 106 may transmit and receive (perform backhaul signaling for) signals with other radio base stations 10 via an inter-base station interface (for example, optical fiber in compliance with CPRI (Common Public Radio Interface), and the X2 interface).

Figure 7:
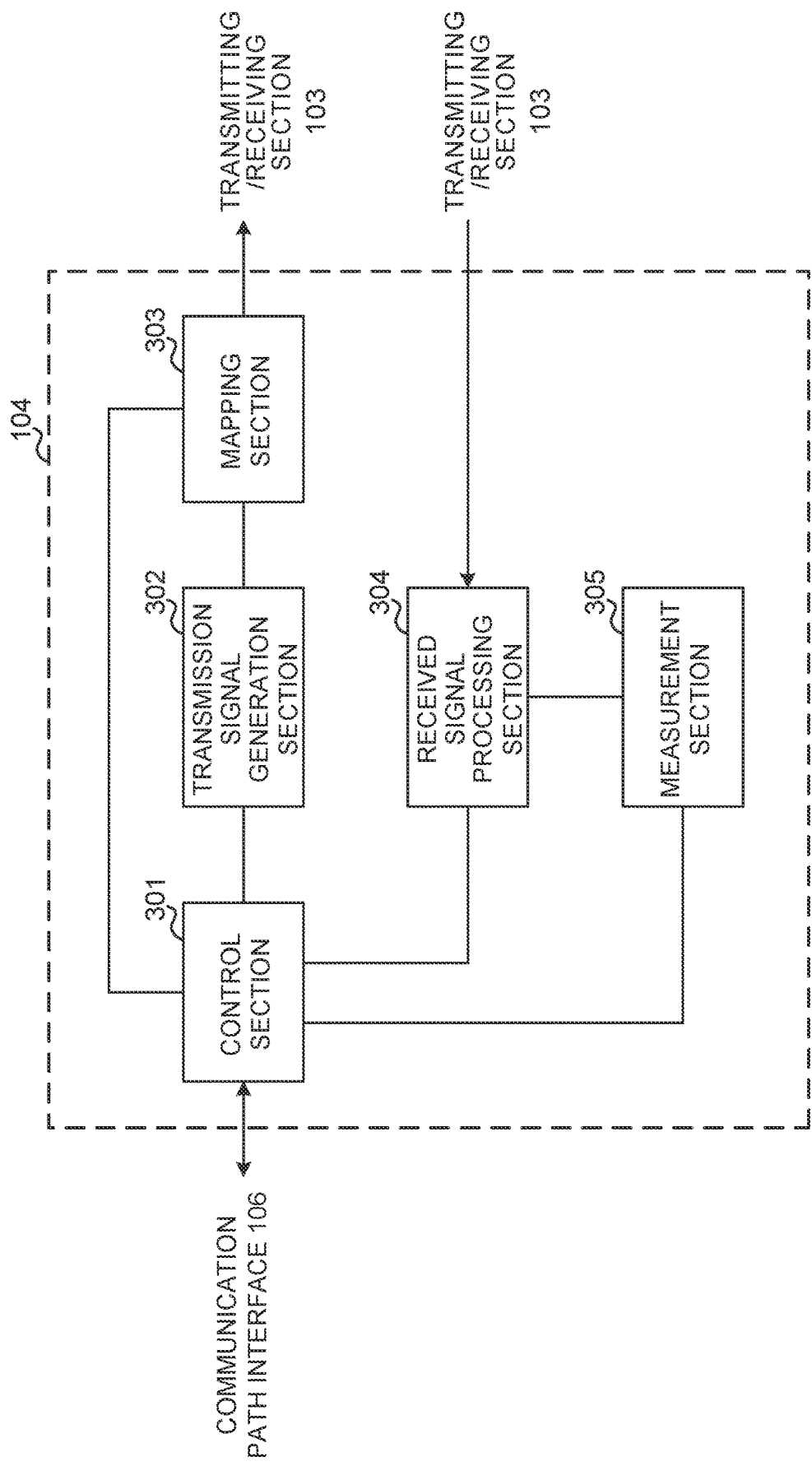
FIG. 7 is a diagram showing an example of a functional configuration of the radio base station according to the embodiment.

FIG. 7 is a diagram showing an example of a functional configuration of the radio base station according to the embodiment. Note that, although this example will primarily show functional blocks that pertain to characteristic parts of the present embodiment, it may be assumed that the radio base station 10 has other functional blocks that are necessary for radio communication as well.

The baseband signal processing section 104 includes at least a control section (scheduler) 301, a transmission signal generation section 302, a mapping section 303, a received signal processing section 304, and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the assignment of signals by the mapping section 303 and so on. Furthermore, the control section 301 controls the signal receiving processes in the received signal processing section 304, the measurements of signals in the measurement section 305, and so on.

The control section 301 controls the scheduling (for example, resource assignment) of system information, downlink data signals (for example, signals transmitted in the PDSCH), and downlink control signals (for example, signals that are transmitted in the PDCCH and/or the EPDCCH, such as delivery acknowledgement information). The control section 301 controls the generation of downlink control signals, downlink data signals and so on, based on the results of determining whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 controls the scheduling for uplink data signals (for example, signals transmitted in the PUSCH), uplink control signals (for example, signals transmitted in the PUCCH and/or the PUSCH, and delivery acknowledgement information), random access preambles (signals transmitted in the PRACH for example), uplink reference signals, and the like.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generation apparatus that can be described based on general understanding of the technical field to which the present invention pertains.

For example, the transmission signal generation section 302 generates DL assignments, which report downlink data assignment information, and/or UL grants, which report uplink data assignment information, based on the instruction from the control section 301. DL assignments and UL grants are both DCI, and follow the DCI format. Further, the downlink data signals are subjected to coding processing and modulation processing in accordance with a coding rate and a modulation scheme, which are determined based on channel state information (CSI) reported from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs, to the control section 301, information decoded by the receiving processing. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurement, CSI (Channel State Information) measurement, and the like based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio), etc.), the signal strength (for example, RSSI (Received Signal Strength Indicator)), transmission path information (for example, CSI), and so on. The measurement results may be output to the control section 301.

The transmitting/receiving section 103 transmits a downlink shared channel (PDSCH (Physical Downlink Shared Channel)) and a PTRS (Phase Tracking Reference Signal).

The control section 301 may perform the scaling of the PTRS transmission power based on a ratio ($\alpha_{PTRS,i}$) between PDSCH EPRE (Energy Per Resource Element) and PTRS EPRE corresponding to the value of the higher layer parameter (for example, epre-RatioPort1 or epre-RatioPort2). The control section 301 may assume that at least one set of the ratios ($\alpha_{PTRS,i}$ set) corresponding to the value of the higher layer parameter includes only the value of the ratio equal to or smaller than a given value (for example, 6 dB).

The control section 301 may obtain a PTRS scaling factor ($\beta_{PTRS,i}$) based on the ratio ($\alpha_{PTRS,i}$), and assume that the PTRS transmission power is scaled based on the $\beta_{PTRS,i}$.

(User Terminal)

Figure 8:
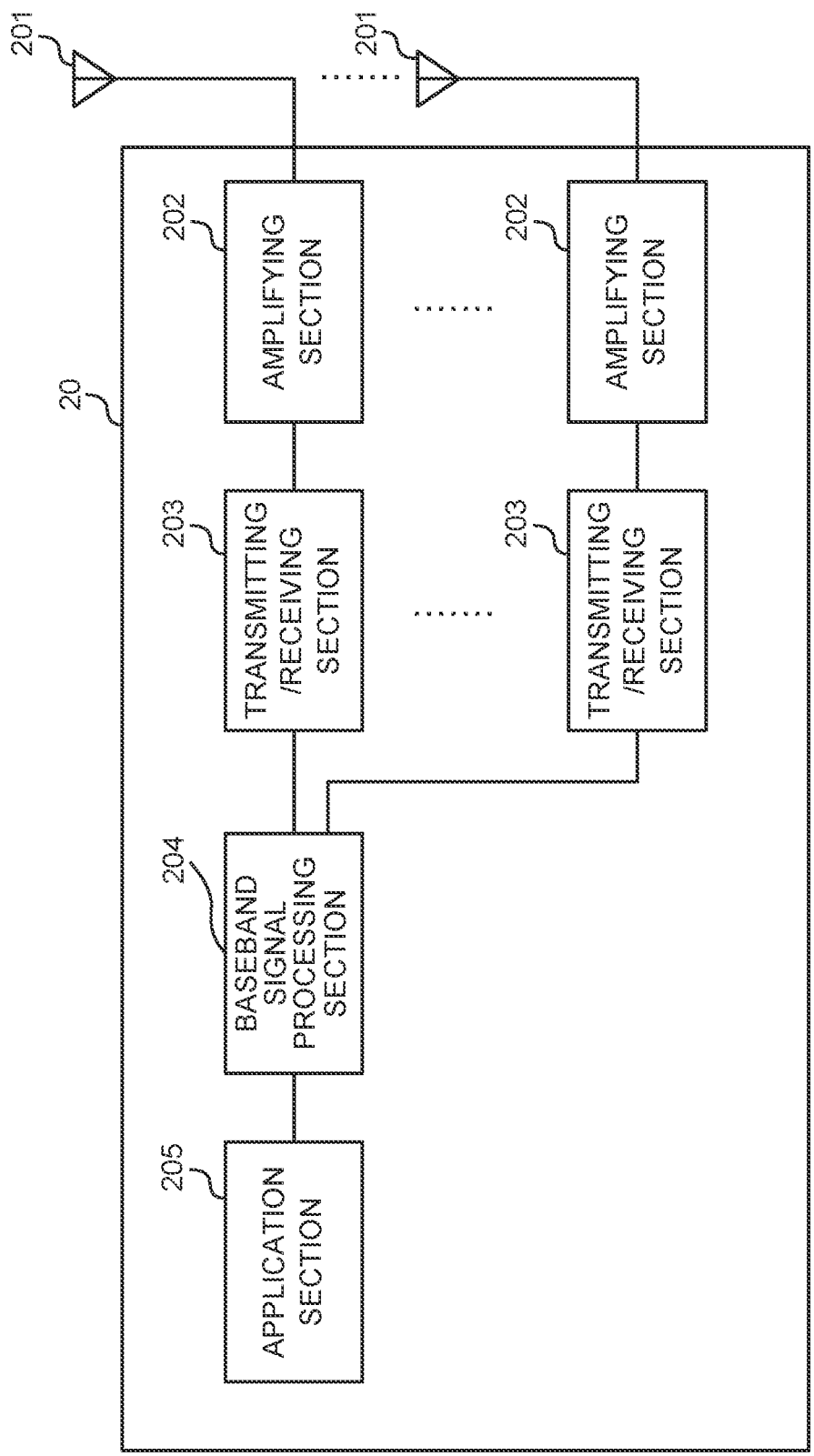
FIG. 8 is a diagram showing an example of an overall configuration of a user terminal according to one embodiment.

FIG. 8 is a diagram showing an example of an overall configuration of a user terminal according to one embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. The transmitting/receiving sections 203 can be constituted by transmitters/receivers, transmitting/receiving circuits or transmitting/receiving device that can be described based on general understanding of the technical field to which the present invention pertains. The transmitting/receiving section 203 may be composed of an integrated transmitting/receiving section, or may be composed of a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. Further, in the downlink data, broadcast information may also be transferred to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals having been subjected to frequency conversion in the transmitting/receiving sections 203 are amplified in the amplifying sections 202, and transmitted from the transmitting/receiving antennas 201.

Figure 9:
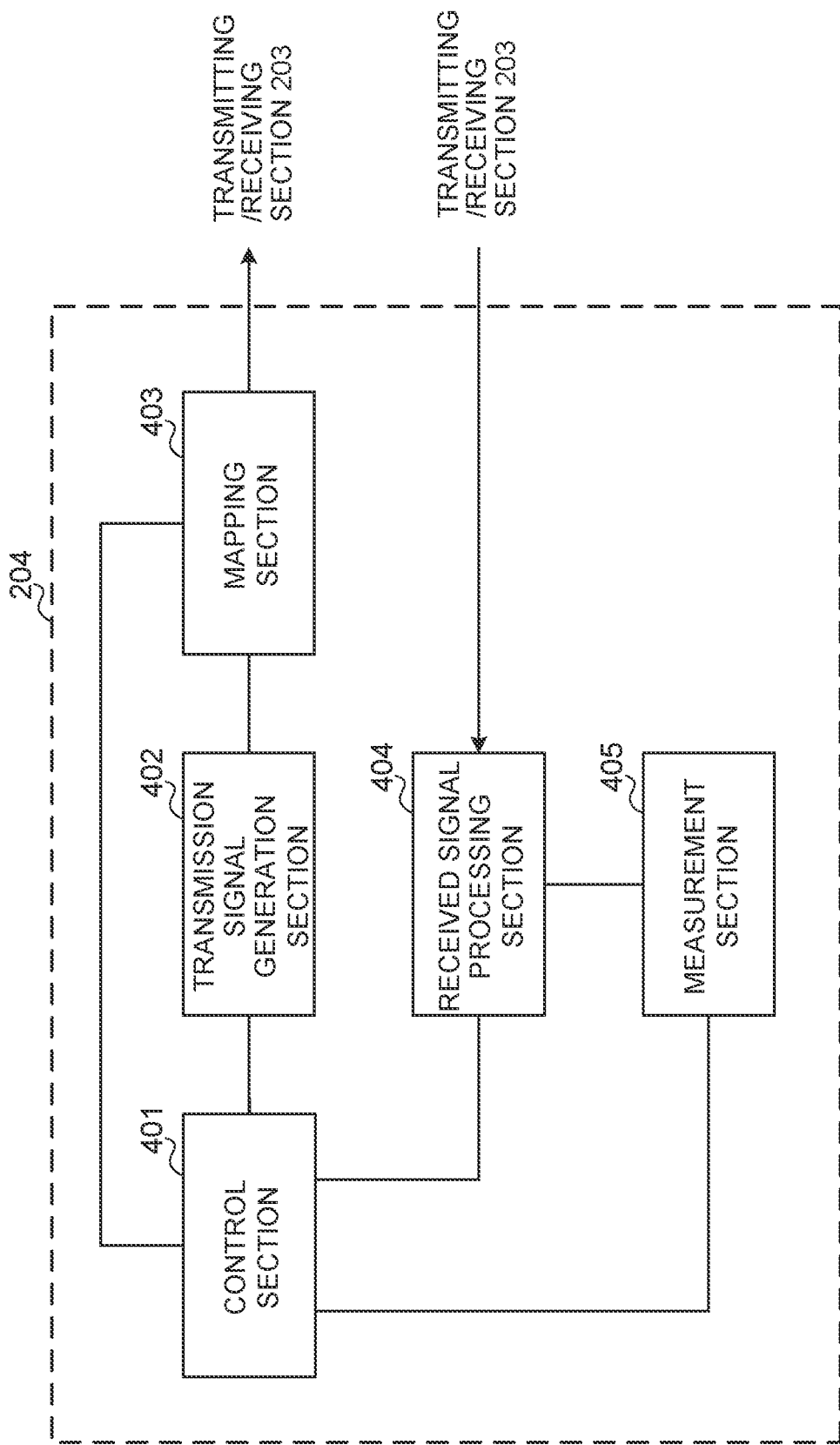
FIG. 9 is a diagram showing an example of a functional configuration of the user terminal according to the embodiment.

FIG. 9 is a diagram showing an example of a functional configuration of the user terminal according to the embodiment. Note that, although this example will primarily show functional blocks that pertain to characteristic parts of the present embodiment, it may be assumed that the user terminal 20 has other functional blocks that are necessary for radio communication as well.

The baseband signal processing section 204 provided in the user terminal 20 at least includes the control section 401, a transmission signal generation section 402, a mapping section 403, a received signal processing section 404 and a measurement section 405. These configurations just need to be included in the user terminal 20, and some or all of the configurations need not be included in the baseband signal processing section 204.

The control section 401 controls the whole of the user terminal 20. The control section 401 can be constituted by a controller, a control circuit or control apparatus that can be described based on general understanding of the technical field to which the present invention pertains.

The control section 401, for example, controls the generation of signals in the transmission signal generation section 402, the assignment of signals in the mapping section 403, and so on. Furthermore, the control section 401 controls the signal receiving processes in the received signal processing section 404, the measurements of signals in the measurement section 405 and so on.

The control section 401 acquires the downlink control signals and downlink data signals, which are transmitted from the radio base station 10, from the received signal processing section 404. The control section 401 controls the generation of uplink control signals and/or uplink data signals based on results of determining whether or not retransmission control is necessary for the downlink control signals and/or the downlink data signals.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission signal generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in the downlink control signal reported from the radio base station 10, the transmission signal generation section 402 is instructed by the control section 401 to generate an uplink data signal.

The mapping section 403 maps the uplink signals generated in the transmission signal generation section 402 to radio resources based on commands from the control section 401, and outputs the result to the transmitting/receiving section 203. The mapping section 403 can be constituted by a mapper, a mapping circuit or mapping apparatus that can be described based on general understanding of the technical field to which the present invention pertains.

The received signal processing section 404 performs receiving processing (for example, demapping, demodulation, decoding, and the like) for received signals input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, SNR, etc.), the signal strength (for example, RSSI), transmission path information (for example, CSI), and so on. The measurement results may be output to the control section 401.

The transmitting/receiving section 203 receives a downlink shared channel (PDSCH (Physical Downlink Shared Channel)) and a PTRS (Phase Tracking Reference Signal).

The control section 401 may assume that the PTRS transmission power is scaled based on a ratio ($\alpha_{PTRS,i}$) between PDSCH EPRE (Energy Per Resource Element) and PTRS EPRE corresponding to the value of the higher layer parameter (epre-RatioPort1 or epre-RatioPort2, for example). The control section 401 may assume that at least one set of the ratios ($\alpha_{PTRS,i}$ sets) corresponding to the value of the higher layer parameter includes only a value of the ratio equal to or smaller than a given value (e.g., 6 dB).

The control section 401 may obtain the PTRS scaling factor ($\beta_{PTRS,i}$) based on the ratio ($\alpha_{PTRS,i}$), and may assume that the PTRS transmission power is scaled based on the $\beta_{PTRS,i}$.

(Hardware Configuration)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be achieved by a single apparatus physically or logically aggregated, or may be achieved by directly or indirectly connecting two or more physically or logically separate apparatuses (using wires, radio, or the like, for example) and using these plural apparatuses.

Figure 10:
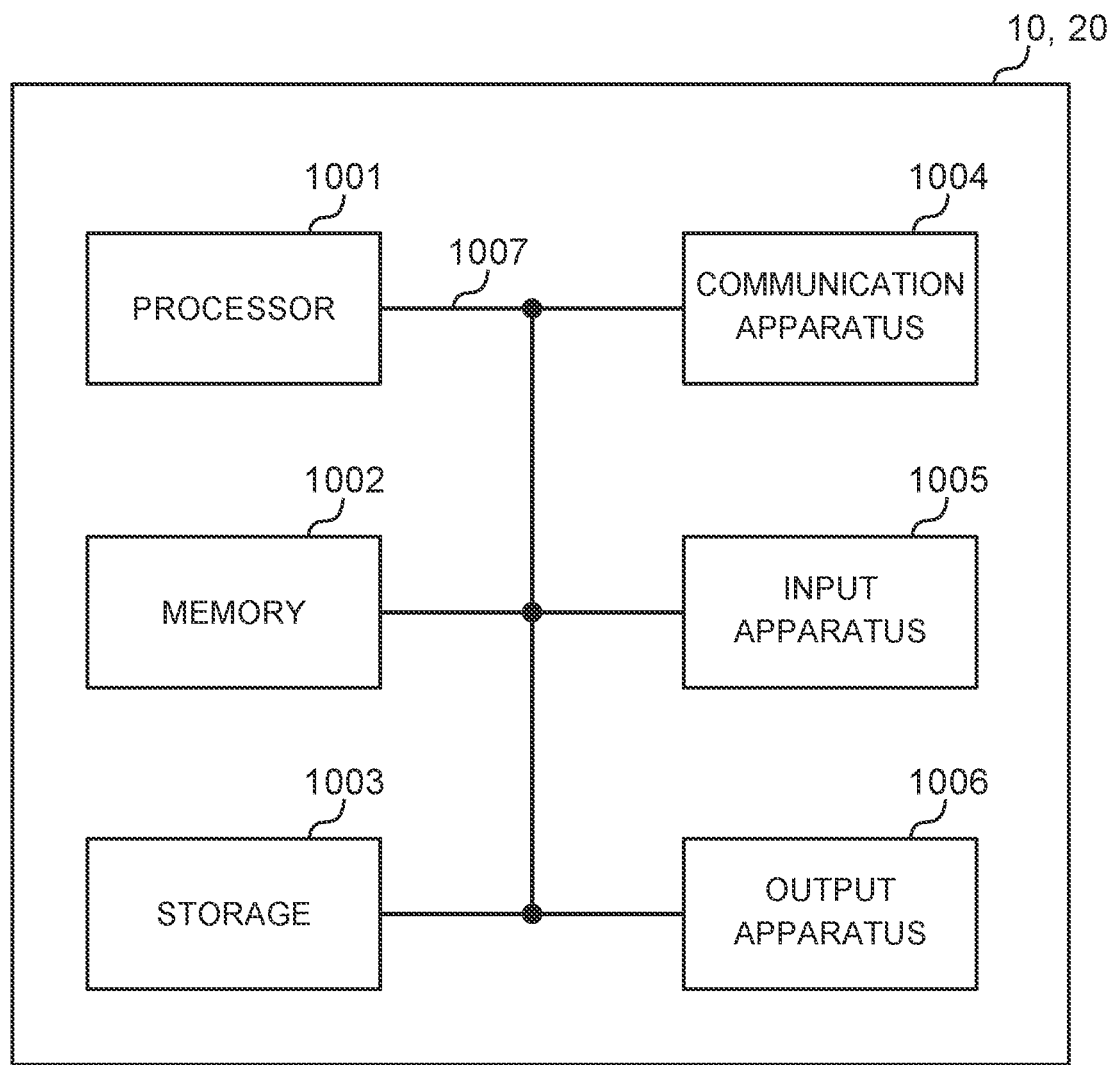
FIG. 10 is a diagram showing an example hardware structure of the radio base station and the user terminal according to the embodiment.

For example, the radio base station, user terminals and so on according to embodiments of the present disclosure may function as a computer that executes the processes of the radio communication method of the present disclosure. FIG. 10 is a diagram showing an example of a hardware configuration of each of the radio base station and the user terminal according to the embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006, and a bus 1007.

Note that, in the following description, the word "apparatus" may be replaced by "circuit", "device", "unit" and so on. The hardware configuration of each of the radio base station 10 and the user terminal 20 may be composed so as to include one or plurality of each apparatus illustrated in the drawing, or may be composed so as not to include a part of the apparatuses.

For example, although only one processor 1001 is illustrated, a plurality of processors may be provided. Furthermore, the processing may be executed by one processor, or the processing may be executed in sequence or in different manners by one or more processors. Note that the processor 1001 may be implemented with one or more chips.

Each function of the radio base station 10 and the user terminal 20 is implemented by reading given software (program) on hardware such as the processor 1001 and the memory 1002, and by controlling the calculations in the processor 1001, the communication in the communication apparatus 1004, and at least one of the reading and writing of data in the memory 1002 and the storage 1003.

The processor 1001 may control the whole computer by, for example, running an operating system. The processor 1001 may be configured with a central processing unit (CPU), which includes interfaces with peripheral apparatuses, a control apparatus, a computing apparatus, a register, and the like. For example, the baseband signal processing section 104 (204), the call processing section 105 and the like, which are mentioned above, may be achieved by the processor 1001.

Furthermore, the processor 1001 reads programs (program codes), software modules or data, from at least one of the storage 1003 and the communication apparatus 1004, into the memory 1002, and executes various processes according to these. As for the programs, programs to allow computers to execute at least part of the operations of the above-described embodiments may be used. For example, the control section 401 of the user terminal 20 may be achieved by a control program that is stored in the memory 1002 and operates in the processor 1001, and other functional blocks may be achieved likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register", a "cache", a "main memory (primary storage apparatus)" and so on. The memory 1002 can store a program (program code), a software module, and the like, which are executable for implementing the radio communication method according to the embodiment of the present disclosure.

The storage 1003 is a computer-readable recording medium, and for example, may be composed of at least one of a flexible disk, a floppy (registered trademark) disk, a magneto-optical disk (for example, a compact disc (CD-ROM (Compact Disc ROM) and the like), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be called an auxiliary storage apparatus.

The communication apparatus 1004 is hardware (transmitting/receiving device) for performing inter-computer communication via at least one of a wired network and a wireless network, for example, is referred to as "network device", "network controller", "network card", "communication module", and the like. The communication apparatus 1004 may be configured to include a high frequency switch, a duplexer, a filter, a frequency synthesizer and so on in order to realize, for example, at least one of frequency division duplex (FDD) and time division duplex (TDD). For example, the transmitting/receiving antennas 101 (201), the amplifying sections 102 (202), the transmitting/receiving sections 103 (203), the communication path interface 106, and the like, which are mentioned above, may be achieved by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). The input apparatus 1005 and the output apparatus 1006 may have an integrated configuration (for example, a touch panel).

Furthermore, these pieces of apparatus, including the processor 1001, the memory 1002 and so on are connected by the bus 1007 so as to communicate information. The bus 1007 may be composed using a single bus, or may be composed using buses different between the apparatuses.

Also, the radio base station 10 and the user terminal 20 may be configured to include hardware such as a microprocessor, a digital signal processor (DSP), an ASIC (Application-Specific Integrated Circuit), a PLD (Programmable Logic Device), and an FPGA (Field Programmable Gate Array), and all or some of the functional blocks may be implemented by the hardware. For example, the processor 1001 may be implemented with at least one of these pieces of hardware.

(Variations)

Note that the terminology used in the present disclosure and the terminology that is needed to understand the present disclosure may be replaced by other terms that convey the same or similar meanings. For example, at least one of "channels" and "symbols" may be replaced by "signals" (or "signaling"). The signal may also be a message. A reference signal may be abbreviated as an "RS", and may be referred to as a "pilot", a "pilot signal" and so on, depending on which standard applies. Furthermore, a component carrier (CC) may be referred to as "cell", "frequency carrier", "carrier frequency", or the like.

Furthermore, a radio frame may be comprised of one or more periods (frames) in the time domain. Each of one or more periods (frames) constituting a radio frame may be referred to as a "subframe". Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols and so on). Further, the slot may be a unit of time based on numerology.

Also, a slot may include a plurality of mini-slots. Each mini-slot may be comprised of one or more symbols in the time domain. Further, the mini-slot may be called a sub-slot. A mini-slot may be composed of fewer symbols than slots. A PDSCH and PUSCH transmitted in a time unit larger than a mini-slot may be referred to as PDSCH/PUSCH mapping type A. A PDSCH and PUSCH transmitted using a mini-slot may be referred to as PDSCH/PUSCH mapping type B.

Each of the radio frame, the subframe, the slot, the mini-slot, and the symbol represents a unit of time at the time of transmitting a signal. A radio frame, a subframe, a slot, a mini-slot, and a symbol may be called by other respective applicable names. For example, one subframe may be called a Transmission Time Interval (TTI), or a plurality of consecutive subframes may be called TTI, or one slot or mini-slot may be called TTI. That is, at least one of a subframe and a TTI may be a subframe (1 ms) in existing LTE, may be a shorter period than 1 ms (for example, one to thirteen symbols), or may be a longer period of time than 1 ms. Note that the unit to represent the TTI may be referred to as a "slot", a "mini slot" and so on, instead of a "subframe".

Here, a TTI refers to the minimum time unit of scheduling in radio communication, for example. For example, in LTE systems, a radio base station schedules radio resources (frequency bandwidth and transmission power that can be used in each user terminal, and the like) to be assigned to each user terminal on a TTI basis. Note that the definition of TTIs is not limited thereto.

TTI may be a unit of time of transmitting channel-encoded data packets (transport blocks), code blocks, codewords, and the like, or may be a unit of processing for scheduling, link adaptation, and the like. When TTI is given, a time interval (for example, the number of symbols) in which the transport blocks, the code blocks, the codewords, and the like are actually mapped may be shorter than TTI.

Note that, when one slot or one mini-slot is referred to as a "TTI", one or more TTIs (that is, one or multiple slots or one or more mini-slots) may be the minimum time unit of scheduling. Moreover, the number of slots (the number of mini-slots) which constitute the minimum unit of time of the scheduling may be controlled.

TTI having a time length of 1 ms may be called usual TTI (TTI in LTE Rel. 8 to 12), normal TTI, long TTI, a usual subframe, a normal subframe, a long subframe, or the like. A TTI that is shorter than a usual TTI may be referred to as "shortened TTI", "short TTI", "partial TTI" (or "fractional TTI"), "shortened subframe", "short subframe", "mini-slot", "sub-slot", or the like.

Note that a long TTI (for example, a normal TTI, a subframe, etc.) may be replaced by a TTI having a time duration exceeding 1 ms, and a short TTI (for example, a shortened TTI) may be replaced by a TTI having a TTI duration less than the TTI duration of a long TTI and not less than 1 ms.

The resource block (RB) is the unit of resource assignment in the time domain and the frequency domain, and may include one or plurality of consecutive subcarriers in the frequency domain. Also, an RB may include one or more symbols in the time domain, and may be one slot, one mini-slot, one subframe, or one TTI in length. One TTI and one subframe each may be comprised of one or more resource blocks. Note that one or more RBs may be referred to as a "physical resource block (PRB (Physical RB))", a "subcarrier group (SCG)", a "resource element group (REG)", a "PRB pair", an "RB pair" and so on.

Furthermore, a resource block may be comprised of one or a plurality of resource elements (REs). For example, one RE may be a radio resource region of one subcarrier and one symbol.

Note that the configurations of radio frames, subframes, slots, mini-slots, symbols, and the like described above are merely examples. For example, configurations pertaining to the number of subframes included in a radio frame, the number of slots per a subframe or a radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs), and the like can be variously changed.

Also, the information and parameters described in the present disclosure may be represented in absolute values or in relative values with respect to given values, or may be represented using other applicable information. For example, a radio resource may be specified by a given index.

The names used for parameters and so on in the present disclosure are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in the present disclosure may be represented by using a variety of different technologies. For example, data, instructions, commands, information, signals, bits, symbols, chips, and the like that may be referenced throughout the above description, may be represented by voltages, currents, electromagnetic waves, magnetic fields or particles, optical fields or photons, or any combination of these.

Further, information, signals and the like can be output in at least one of a direction from higher layers to lower layers and a direction from lower layers to higher layers. Information, signals, and the like may be input and output via a plurality of network nodes.

The information, signals and so on that are input and/or output may be stored in a specific location (for example, in a memory), or may be managed in a control table. The information, signals and so on to be input and/or output can be overwritten, updated or appended. The information, signals, and the like that are output may be deleted. The information, signals, and the like, which are input, may be transmitted to other apparatuses.

The reporting of information is by no means limited to the aspects/embodiments described in the present disclosure, and may be performed using other methods. For example, the reporting of information may be implemented by physical layer signaling (for example, downlink control information (DCI), uplink control information (UCI)), higher layer signaling (for example, RRC (Radio Resource Control) signaling, broadcast information (master information block (MIB), system information block (SIB), and the like), and MAC (Medium Access Control) signaling), other signals or combinations of these.

Note that physical layer signaling may be referred to as "L1/L2 (Layer 1/Layer 2) control information (L1/L2 control signals)", "L1 control information (L1 control signal)" and so on. Also, RRC signaling may be referred to as "RRC messages", and can be, for example, an RRC connection setup (RRCConnectionSetup) message, RRC connection reconfiguration (RRCConnectionReconfiguration) message, and so on. Moreover, the MAC signaling may be reported using, for example, MAC control elements (MAC CEs).

Further, reporting of given information (for example, reporting of information to the effect that "X holds") does not necessarily have to be sent explicitly, and may be sent implicitly (for example, by not reporting this given information, or by reporting another piece of information).

Decisions may be made in values represented by one bit (0 or 1), may be made in Boolean values that represent true or false, or may be made by comparing numerical values (for example, comparison against a given value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using at least one of wired technologies (coaxial cables, optical fiber cables, twisted-pair cables, digital subscriber lines (DSLs), and the like) and wireless technologies (infrared radiation, microwaves, and the like), at least one of these wired technologies and wireless technologies are also included in the definition of communication media.

The terms "system" and "network" as used in the present disclosure are used interchangeably.

In the present disclosure, the terms such as "Base Station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and "bandwidth part (BWP)" may be used interchangeably. The base station may be called a term such as a macro cell, a small cell, a femto cell, a pico cell, and the like.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to all or part of the coverage area of at least one of a base station and a base station subsystem that provides communication services within this coverage.

In the present disclosure, the terms "mobile station (MS)" "user terminal", "user equipment (UE)", "terminal", etc. may be used interchangeably.

A mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station and the mobile station may be called a transmitting device, a receiving device, or the like. Note that at least one of a base station and a mobile station may be a device mounted on a moving body, a moving body itself and so on. The moving body may be a transportation (for example, a car, an airplane and so on), an unmanned moving body (for example, a drone, an autonomous car and so on), or a (manned or unmanned) robot. Note that at least one of the base station and the mobile station also includes a device that does not necessarily move during a communication operation.

Furthermore, the radio base stations in the present disclosure may be replaced by user terminals. For example, each aspect/embodiment of the present disclosure may be applied to a configuration in which communication between a radio base station and a user terminal is replaced by communication among a plurality of user terminals (which may be referred to as, for example, D2D (Device-to-Device), V2X (Vehicle-to-Everything) and so on). In this case, the user terminal 20 may have the functions of the radio base station 10 described above. In addition, terms such as "uplink" and "downlink" may be interpreted as a term corresponding to communication between terminals (for example, "side"). For example, an uplink channel may be interpreted as a side channel.

Likewise, the user terminals in the present disclosure may be interpreted as radio base stations. In this case, the radio base stations 10 may have the functions of the user terminals 20 described above.

Certain actions that have been described in the present disclosure to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts and so on that have been used to describe the aspects/embodiments in the present disclosure may be re-ordered as long as inconsistencies do not arise. For example, although various steps have been described in the present disclosure with various components of steps in exemplary orders, the specific orders that are described in the present disclosure are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these. Further, a plurality of systems may be combined and applied (for example, a combination of LTE or LTE-A and 5G).

The phrase "based on" as used in the present disclosure does not mean "based only on", unless otherwise specified. In other words, the phrase "based on" means both "based only on" and "based at least on".

Reference to elements with designations such as "first", "second" and so on as used in the present disclosure does not generally limit the number/quantity or order of these elements. These designations are used in the present disclosure only for convenience, as a method for distinguishing between two or more elements. Hence, references of first and second elements do not mean that only two elements are adoptable, or that the first element must precede the second element in some way.

The term "determining" as used in the present disclosure may encompass a wide variety of actions. For example, "determining" may be regarded as "determining" judging, calculating, computing, processing, deriving, investigating, looking up (for example, looking up in a table, database, or another data structure), ascertaining, and the like.

Furthermore, "determining" as used herein may be interpreted to mean making judgements and determinations related to receiving (for example, receiving information), transmitting (for example, transmitting information), inputting, outputting, accessing (for example, accessing data in a memory) and so on.

In addition, "determining" as used herein may be interpreted to mean making judgements and determinations related to resolving, selecting, choosing, establishing, comparing, and so on. In other words, "determining" as used in the present disclosure may be interpreted to mean making judgements and determinations related to some action.

In addition, "determining" as used herein may be interpreted to mean "assuming", "expecting", "considering" and so on.

As used in the present disclosure, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced by "access".

In the present disclosure, when two elements are connected to each other, these elements can be considered "connected" or "coupled" to each other by using one or more electrical wires, cables, printed electrical connections, and the like, and, as a number of non-limiting and non-inclusive examples, by using electromagnetic energy having wavelengths in a radio frequency domain, a microwave domain, an optical (both visible and invisible) domain, and the like.

In the present disclosure, the phrase "A and B are different" may mean "A and B are different from each other". The terms such as "leave", "coupled" and the like may be interpreted as well.

When the terms such as "include", "including", and variations of these are used in the present disclosure or claims, these terms are intended to be inclusive, in a manner similar to the way the term "comprising" is used. Furthermore, the term "or" as used in this disclosure or in claims is intended to be not an exclusive disjunction.

For example, when articles, such as "a", "an", and "the" in English, are added by translation in the present disclosure, the present disclosure may include that nouns which follow these articles are in plural.

(Note)

The supplementary matters of the present disclosure will be described as notes. Specifically, the following configurations are proposed.

[Configuration 1]

A user terminal including:

a receiving section configured to receive a downlink shared channel (PDSCH (Physical Downlink Shared Channel)) and a PTRS (Phase Tracking Reference Signal); and a control section configured to assume that transmission power for the PTRS is scaled based on a ratio between PDSCH EPRE (Energy Per Resource Element) and PTRS EPRE corresponding to a value of a higher layer parameter, in which at least one set of the ratios corresponding to the value of the higher layer parameter includes only a value of the ratio that is equal to or smaller than a given value.

[Configuration 2]

A radio base station including:

a transmitting section configured to transmit a downlink shared channel (PDSCH (Physical Downlink Shared Channel)) and a PTRS (Phase Tracking Reference Signal); and a control section configured to assume that transmission power for the PTRS is scaled based on a ratio between PDSCH EPRE (Energy Per Resource Element) and PTRS EPRE corresponding to a value of a higher layer parameter, in which at least one set of the ratios corresponding to the value of the higher layer parameter includes only a value of the ratio that is equal to or smaller than a given value.

[Configuration 3]

A radio communication method for a user terminal, the method including:

a step of receiving a downlink shared channel (PDSCH (Physical Downlink Shared Channel)) and a PTRS (Phase Tracking Reference Signal); and a step of assuming that transmission power for the PTRS is scaled based on a ratio between PDSCH EPRE (Energy Per Resource Element) and PTRS EPRE corresponding to a value of a higher layer parameter, in which at least one set of the ratios corresponding to the value of the higher layer parameter includes only a value of the ratio that is equal to or smaller than a given value.

Now, although invention according to the present disclosure has been described above in detail, it is obvious to those skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description in the present disclosure is provided only for the purpose of explaining examples, and should by no means be construed to limit the invention according to the present disclosure in any way.

This application is based on Japanese Patent Application No. 2018-110695 filed on May 23, 2018. All of this content is included here.

The invention claimed is:

1. A terminal comprising:
   a receiver that receives a downlink shared channel (PDSCH (Physical Downlink Shared Channel)) and a PTRS (Phase Tracking Reference Signal); and
   a processor that assumes that transmission power for the PTRS is scaled based on a ratio between a PDSCH EPRE (Energy Per Resource Element) and a PTRS EPRE, the ratio being included in a set of ratios that corresponds to a value of a higher layer parameter,
   wherein, when at least one ratio of the set of ratios is not equal to zero, each ratio of the set of ratios is equal to or smaller than 6 dB.

2. A radio communication method for a terminal, the method comprising:
   receiving a downlink shared channel (PDSCH (Physical Downlink Shared Channel)) and a PTRS (Phase Tracking Reference Signal); and
   assuming that transmission power for the PTRS is scaled based on a ratio between a PDSCH EPRE (Energy Per Resource Element) and a PTRS EPRE, the ratio being included in a set of ratios that corresponds to a value of a higher layer parameter,
   wherein, when at least one ratio of the set of ratios is not equal to zero, each ratio of the set of ratios is equal to or smaller than 6 dB.

3. The terminal according to claim 1, wherein the processor assumes that the transmission power for the PTRS is scaled based on:
   a scaling factor, and
   the ratio between the PDSCH EPRE and the PTRS EPRE corresponding to the value of a higher layer parameter, and
   wherein the scaling factor is based on the ratio.

* * * * *